US008919092B2

(12) United States Patent
Figenschou et al.

(10) Patent No.: US 8,919,092 B2
(45) Date of Patent: Dec. 30, 2014

(54) SZ WINDING MACHINE

(75) Inventors: Arild Figenschou, Billingstad (NO); Finn Peter Gjerull, Hovik (NO)

(73) Assignee: Aker Subsea AS, Lysaker (NO)

( * ) Notice: Subject to any disclaimer, the term of this patent is extended or adjusted under 35 U.S.C. 154(b) by 475 days.

(21) Appl. No.: 13/122,463

(22) PCT Filed: Oct. 5, 2009

(86) PCT No.: PCT/NO2009/000343

§ 371 (c)(1), (2), (4) Date: Apr. 4, 2011

(87) PCT Pub. No.: WO2010/041953

PCT Pub. Date: Apr. 15, 2010

(65) Prior Publication Data

US 2011/0185559 A1 Aug. 4, 2011

(30) Foreign Application Priority Data

Oct. 6, 2008 (NO) .................................... 20084172

(51) Int. Cl.

| | |
|---|---|
| ***D01H 13/26*** | (2006.01) |
| ***D01H 7/92*** | (2006.01) |
| ***D01H 7/00*** | (2006.01) |
| ***G02B 6/44*** | (2006.01) |
| ***B23P 21/00*** | (2006.01) |
| ***H01B 13/02*** | (2006.01) |
| ***D07B 3/00*** | (2006.01) |
| *H01B 7/00* | (2006.01) |
| *H01B 7/04* | (2006.01) |

(52) U.S. Cl.

CPC ............ *H01B 13/0271* (2013.01); *D07B 3/005* (2013.01); *H01B 7/0072* (2013.01); *H01B 7/045* (2013.01)

USPC ................ 57/293; 57/6; 57/11; 57/12; 57/13; 57/204; 57/230; 385/100; 385/101; 29/771; 29/779

(58) Field of Classification Search

USPC ........ 29/525, 428, 771, 779; 57/6, 11, 12, 13, 57/204, 230, 235, 293; 385/100–113

See application file for complete search history.

(56) References Cited

U.S. PATENT DOCUMENTS 4,432,196 A * 2/1984 Schmitz et al. ................. 57/204
4,459,799 A * 7/1984 Beucher .......................... 57/293

(Continued)

FOREIGN PATENT DOCUMENTS

GB 2219063 A 11/1989
WO WO-93/17176 A1 9/1993

(Continued)

OTHER PUBLICATIONS

Westöö, Magnus / JA A, "International Search Report", for PCT/NO2009/000343 as mailed Jan. 22, 2010, 4 pages.

*Primary Examiner* — Essama Omgba
*Assistant Examiner* — Darrell C Ford
(74) *Attorney, Agent, or Firm* — Winstead PC

(57) ABSTRACT

An SZ laying machine for umbilical/power umbilical is described. Starting from an input end the machine includes: a first die receiving and collecting a first set of elongate elements substantially rectilinear from respective supplies of elongate elements, a second static die which receives and collects a second set of elongate elements substantially rectilinear from respective supplies of elongate elements and this second set is closed together with the first set into an assembled bundle, at least one supporting means which keeps the assembled bundle radially in place; a revolving device able to torsional rotate the bundle back and forth in an oscillating SZ manner, and a tape or band winding apparatus which in immediate proximity to the revolving device applies band or tape circumferentially onto the SZ laid bundle of elongate elements.

4 Claims, 2 Drawing Sheets

(56) References Cited

U.S. PATENT DOCUMENTS

| | | | | |
|---|---|---|---|---|
| 4,528,810 | A * | 7/1985 | Vogelsberg | 57/294 |
| 4,773,207 | A * | 9/1988 | Cramer | 57/294 |
| 4,813,223 | A * | 3/1989 | Nipper et al. | 57/294 |
| 5,325,457 | A * | 6/1994 | Bottoms et al. | 385/113 |
| 5,699,660 | A * | 12/1997 | Buluschek | 57/293 |
| 5,751,879 | A * | 5/1998 | Graham et al. | 385/103 |
| 5,799,477 | A * | 9/1998 | Seibert | 57/293 |
| 6,000,209 | A * | 12/1999 | Ito et al. | 57/293 |
| 6,052,891 | A * | 4/2000 | Kumpf | 29/745 |
| 6,318,061 | B1 * | 11/2001 | Schneider et al. | 57/7 |
| 6,370,753 | B1 * | 4/2002 | Washburn | 29/407.01 |
| 6,917,737 | B2 * | 7/2005 | Uhlenhuth et al. | 385/104 |
| 8,620,124 | B1 * | 12/2013 | Blazer et al. | 385/102 |
| 8,798,417 | B2 * | 8/2014 | Blazer et al. | 385/112 |
| 2004/0081412 | A1 * | 4/2004 | Cocchini et al. | 385/104 |
| 2010/0163270 | A1 * | 7/2010 | Hawkes | 174/108 |

FOREIGN PATENT DOCUMENTS

| | | | |
|---|---|---|---|
| WO | WO-2008/075964 | A1 | 6/2008 |
| WO | WO-2008/075965 | A1 | 6/2008 |

* cited by examiner

SZ WINDING MACHINE

BACKGROUND

1. Field of the Invention

The present invention relates to a machine for SZ closing/laying of an umbilical/power umbilical comprising a plurality of elongated elements, which elongated elements are different regarding transversal cross section, material, function and in number.

2. History of the Related Art

Typically such elongated elements constitute one or more among the following traditional components of an umbilical/power umbilical: power cables for transfer of vast amounts of electric power, fluid pipes of same or different transversal cross sectional dimensions, electric wires for control purposes etc, optical conductors, filler material in the form of stiff or rigid elongated elements which are laying at least partly around and between the other elongated elements, such as the fluid pipes, the power cables and the wires/conductors, and possibly one or more load carrying elements predetermined located within the transversal cross section of the umbilical, or power umbilical, such as steel wire or carbon rods, individually or gathered into bundles. However, several of the elements may be similar to each other. Thus it is to be understood that it is not that important which type of elements that are closed together, but the way this is performed and how the machine which is able to perform this is constructed, which is the new and inventive.

Accordingly the present invention also relates to a method for SZ closing/laying of an umbilical/power umbilical by means of a machine as defined above. As disclosed in WO Publication No. 2008/075965, the term "SZ" refers to a winding method wherein elongated elements are wound with alternating winding directions.

A well proven closing machine which over a long period of time is used for production of classic umbilicals, i.e. of the type which are helically twisted about its longitudinal axis, is briefly described and illustrated in FIG. 1-5 in WO 93/17176 (NO174 940). Another type of closing machine, in particular used for SZ closing of cables, is schematically illustrated in FIG. 7 of WO publication 2008/075965. As far as we know this represents the state of the art. One object with the present invention is to design a closing/laying machine which is substantially simplified relative to the voluminous and kind of complicated laying machines available today. Besides, it is a desire to be able to design such a machine to be mobile, i.e. be able to move the machine from place to place without too comprehensive and complicated operations.

This is achieved with a machine of the introductory said kind which is distinguished in that the laying machine is arranged in the following component sequence when viewed in the pulling direction starting at an entry end: a first die which receives and gathers a first set of elongated elements substantially rectilinear from respective supplies of elongated elements, a static second die which receives and gathers a second set of elongated elements substantially rectilinear from respective supplies of elongated elements and close these together with the first set into a gathered bundle, at least one supporting means which keeps the gathered bundle radially in place; a revolving device able to revolve the bundle torsional back and forth in an SZ oscillating way, and a tape or band wrapping apparatus which immediate after the revolving device applies band or tape circumferentially onto the SZ laid bundle of elongated elements.

Thus the enormous revolving carousels carrying a plurality of bobbins which in turn revolves about their bobbin axis, is avoided. See FIG. 1-5 of WO 93/17176. These conditions are substantially improved with the machine shown in FIG. 7 of WO 2008/075965. However, such a machine is primarily designed for manufacture of existing cables during common cable production, but the principle was proposed used to manufacture the SZ closed umbilical according to WO 2008/075965. However, one has still not arrived there, other than that this umbilical is manufactured in shorter test lengths. The now suggested closing/laying machine is indeed constructed for full scale production of continuous lengths of umbilicals of very different transversal cross section profiles, which also includes power umbilicals of the nature shown in WO 2008/075964.

Normally the elongated elements will be one or more among the following traditional components in an umbilical/power umbilical: power cables for transfer of vast amounts of electric power, fluid pipes, electric wires, optical conductors, filler material in the form of stiff elongated plastic elements (PVC) which are laying at least partly around and between the power cables and the wires/conductors, and one or more load carrying elements predetermined located in the transversal cross section of the umbilical or power umbilical.

One type of load carrying elements is carbon rods having embedded strength fibres. They have equally large axial strength as steel, but 10% of the weight only. The actual force that each carbon rod transfers is approximately 3% of its load capacity only. It is the axial stiffness that is created within the umbilical that is crucial. The umbilical is close to be without elongation when it is SZ closed and external strength band is wrapped around.

Conveniently, the means that provides for the pulling action of the umbilical through the machine can be one or more sets of caterpillar tracks.

Preferably the machine includes turning mechanisms which is able to alter the direction of the advanced elongated elements.

Preferably the machine includes means that applies a protective sheath which envelops the respective elongated elements that may be included in a dedicated umbilical/power umbilical.

In a preferable embodiment the revolving means that performs the closing action, may revolve one revolution per approximately 10 meters of umbilical length.

Further, a method of the introductory said kind is provided, which is distinguished in that the method includes introduction of a first set of elongated elements into the entry end of the closing/laying machine and into a first die which receives and gathers the respective elongated elements substantially rectilinear from respective supplies of elongated elements, that a second set of elongated elements is advanced to a second, static die and is merged with the first set of elongated elements advanced from the first die, that all the elongated elements are introduced into the static, second die and are closed into a bundle of elongated elements, that the bundle after the closing thereof, is further advanced to one or more supporting means which keeps the bundle radially in place, that the bundle is further advanced to a revolving device which revolves the bundle torsional back and forth in an SZ oscillating way, and that a tape or band is circumferentially applied onto the SZ closed/laid bundle of elongated elements.

Conveniently the umbilical is pulled through the machine by one or more set of caterpillar track means.

Preferably, a protective sheath that envelops the respective elongated elements that may be included in a dedicated umbilical/power umbilical, is applied subsequent to the wrapping of a band or tape.

BRIEF DESCRIPTION OF THE FIGURES

Other and further objects, features and advantages will appear from the following description of preferred embodiments of the invention, which are given for the purpose of description, and given in context with the appended drawings where.

DETAILED DESCRIPTION

Figures 1, 2A, 2B, 2C, 2D, 2E, 2F:
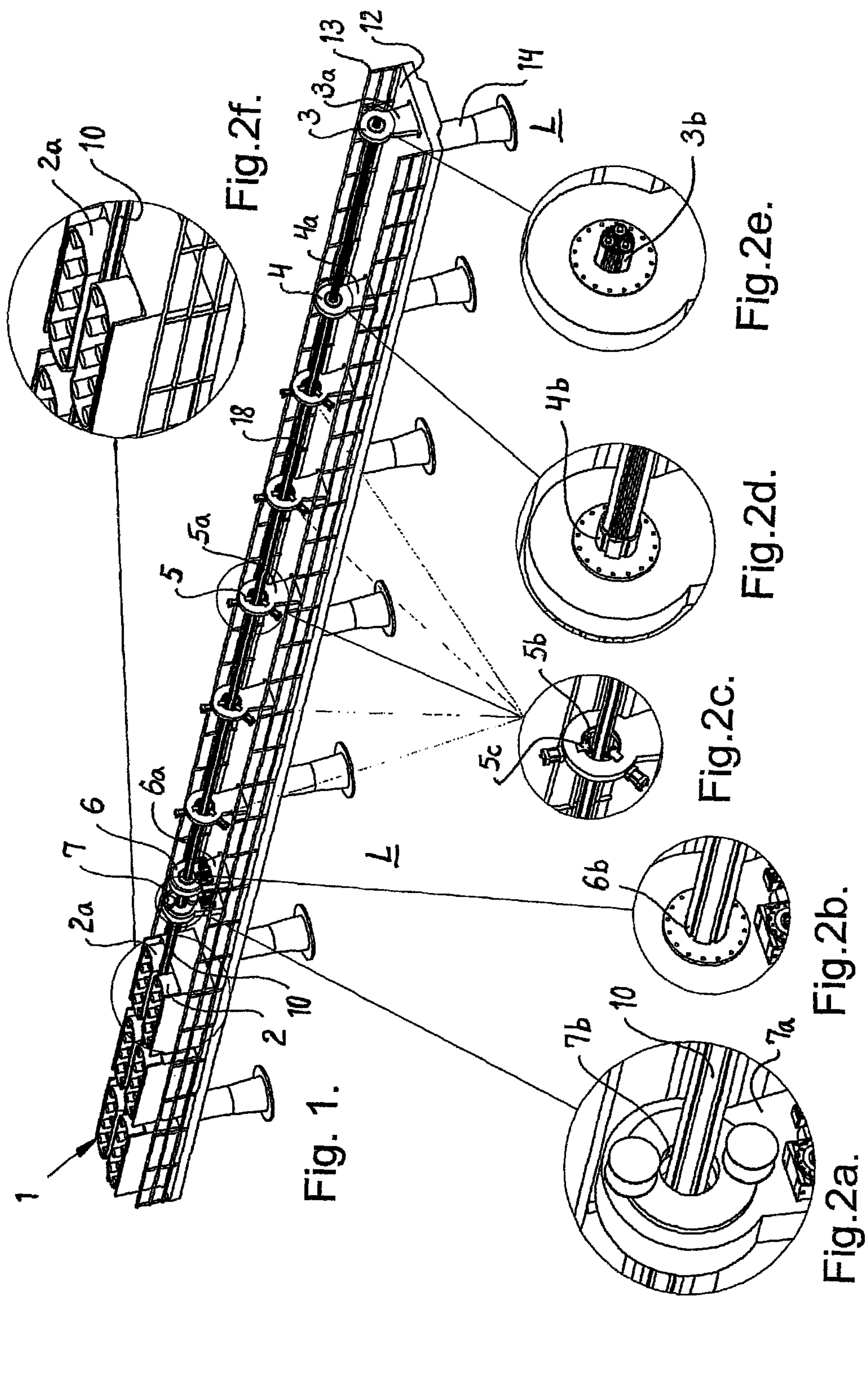
FIG. 1 shows in perspective view a closing/laying machine according to the invention.
FIG. 2*a*-2*f* show encircled details of the machine shown in FIG. 1.
Figure 3:
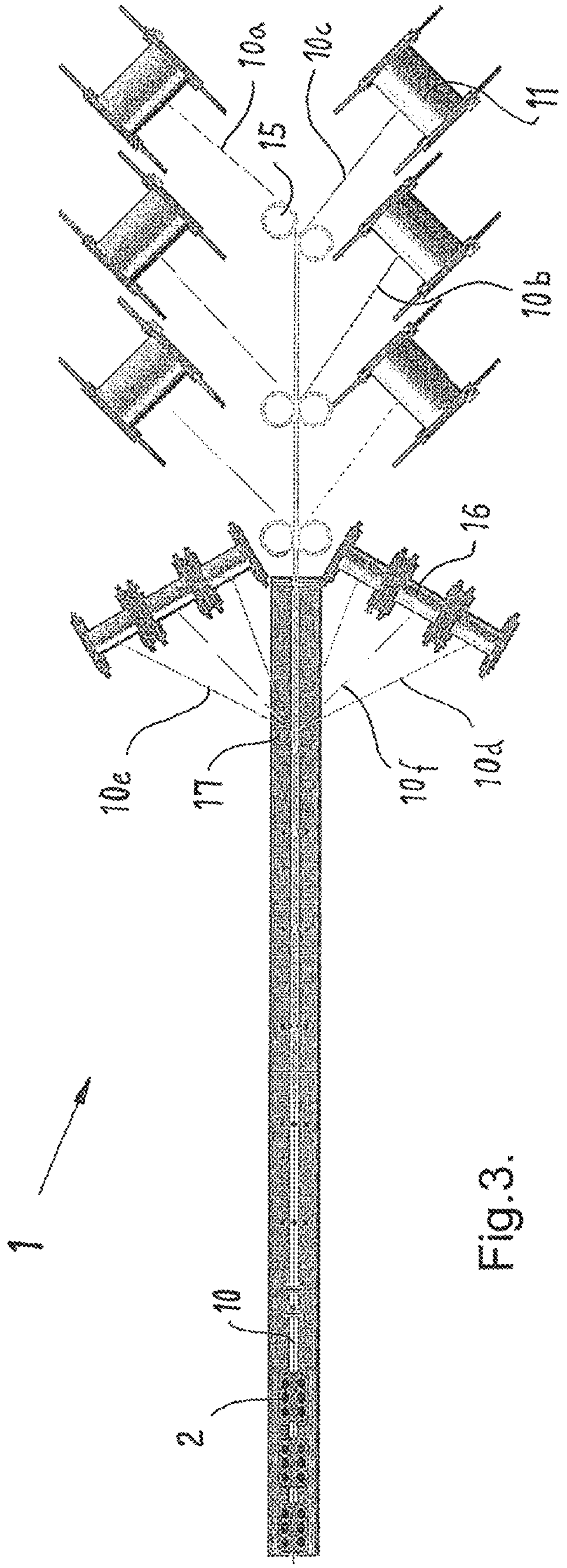
FIG. 3 shows a top view of a closing/laying machine according to the invention.
Figure 4:
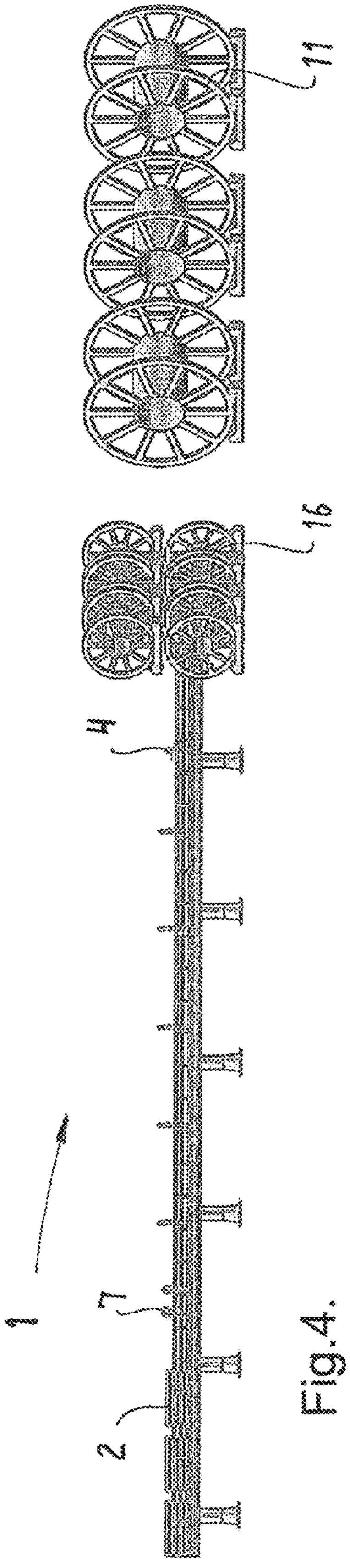
FIG. 4 shows an elevation view of a closing/laying machine according to the invention.

With reference to FIG. 1 a machine 1 for SZ closing of an umbilical 10 or power umbilical is generally shown. The umbilical is made up by a plurality of elongated elements 10*a*-10*e* which are different with regard to transversal cross sectional form, material, function and in number. Typically such elongated elements will be one or more among the following traditional components of an umbilical/power umbilical: power cables for transfer of vast amounts of electric power, fluid pipes, electric wires, optical conductors, filler material in the form of stiff elongated plastic elements, often of PVC, and one or more load carrying elements predetermined located in the transversal cross section of the umbilical or power umbilical. The filler material will normally be located at least partly around and between the power cables and the wires/conductors. One type of load carrying elements is carbon rods having embedded strength fibres. They have equally large axial strength as steel, but 10% of the weight only.

The closing/laying machine 1 is assembled in a particular way and the individual components that are to provide for particular functions are arranged in a defined order. In that end of the closing machine 1 where the finished umbilical 10 exits, a number of caterpillar tracks means 2 are located, here shown three similar units, which are able to pull the umbilical 10 through the closing machine 1. The caterpillar tracks means 2 are such arranged that two sets of elongated belts 2*a* are facing each other and sandwiches the umbilical 10 therebetween. At the same time the belts 2*a* are driven in an endless path and thus pull the umbilical 10 through the closing machine 1. The two sets are equipped with means that provides for adjustable pinch force against the umbilical 10.

At the opposite end of the machine the elongated elements 10*a*-10*f* that the umbilical 10 is to be assembled of, are fed into the closing machine 1. Each individual elongated element 10*a*-10*f* departs from respective supply, typically a bobbin 11, or a reel, onto which the element 10*a*-10*f* is stored.

The closing machine 1 will typically be elevated from ground level L in order to have space for a large number of bobbins 11, or reels, having large diameter and capacity, possibly two in height. The closing machine 1 is located on a platform 12, something like a gangway, having a hand rail 13. The platform 12 is standing on columns 14 which in turn are founded to the base or ground L.

The closing machine 1 is described further according to a defined component order when viewed in the pulling direction and starting from an entry end. A first die 3 is placed on a pedestal 3*a* projecting from the platform 12. The first die 3 has an opening 3*b* which receives and gathers a first set of elongated elements 10*a*-10*c* from respective supplies 11 of elongated elements. The elongated elements 10*a*-10*c* readily extend aslant from the bobbins 11 and towards the closing machine 1. A turning mechanism 15 for each elongated element 10*a*-10*e* is arranged adjacent to the first die 3. Each turning mechanism 15 ensures that the direction in which an elongated element is advanced from the bobbins 11 is converted into a substantially rectilinear motion, and without any torsional twisting towards the opening 3*b* of the die. From the turning mechanism 15 and towards the opening 4*b* all actual elongated elements 10*a*-10*e* extend in parallel.

A second die 4 is also placed on a pedestal 4*a* projecting from the platform 12. The second die 4 is static and has an opening 4*b* which receives and gathers a second set of elongated elements 10*d*-10*f* from respective second supplies 16 of elongate elements 10*d*-10*f*. Also this time the elongated elements 10*d*-10*f* readily extend aslant from the bobbins 16 and towards the closing machine 1. Another turning mechanism 17 for each elongated element 10*d*-10*f* is arranged close to the second die 4. Each turning mechanism 17 ensures, as before, that the direction in which an elongated element is advanced from the bobbins 16 is converted into a substantially rectilinear motion, and without torsional twisting towards the opening 4*b* of the die 4. From the turning mechanism 17 and towards the opening 4*b* all actual elongated elements 10*d*-10*f* extend in parallel and now in parallel with the elongated elements 10*a*-10*c* extending from the first die 3.

In the static die 4 all the elongated elements 10*a*-10*f* are closed together into a bundle 18 and where the bundle 18 subsequent to the closing together extends substantially rectilinear and without any internal torsional twist. The stabilizing, static die 4 has an opening 4*b* which is complementary to the external shape of the closed together bundle 18. In practise, this means that the external shape of the bundle 18 has longitudinal grooves or splines which have a corresponding shape in the die opening 4*b*. This is because the die 4 shall be able to retain the umbilical against torsional rotation.

From the die 4 the now closed together bundle 18 is advanced to one or more supporting means 5, here shown a number of five, which are able to retain the bundle 18 radially in place, also when exposed for torsional forces. Each supporting means 5 is placed on a pedestal 5*a* projecting from the platform 12. The support means 5 has an opening 5*b* which is arranged with a number of peripherally placed rollers 5*c* which is abutting against the surface of the bundle 18 and keeps the bundle 18 radially in place. From there the bundle 18 is advanced further to a revolving device 6. The revolving device 6 is also located on top of a pedestal 6*a* projecting from the platform 12. The revolving device 6 has an opening 6*b* which also is complementary to the external shape of the closed together bundle 18. This will tell that the internal shape of the opening 6*b* has longitudinal splines or grooves. This, because the revolving device 6 shall be able to twist the umbilical while it is passing through the opening 6*b*. Simultaneously, the umbilical 1 is retained against torsional rotation by the static die 4. This means that torsional twisting can take place between the revolving device 6 and the static die 4 only. The revolving device 6 that ensures the closing action will normally revolve one turn per approximately 10 meter of umbilical length, without thereby being a limitation. However, a long laying length is to prefer in many situations, particularly with regard to twisting during axial loads.

Subsequent to the revolving device 6 a tape or band wrapping apparatus 7 is arranged, which immediately after the revolving device 6 applies band or tape circumferentially onto the SZ closed/laid bundle 18 of elongated elements 10*a*-10*f*. The band wrapping apparatus 7 is also placed onto a pedestal 7*a* projecting from the platform 12. The band wrapping apparatus 7 has an opening 7*b* which the closed together bundle 18 passes through and further on to a caterpillar tracks means 2.

The invention claimed is:

1. A machine for SZ laying of an umbilical/power umbilical the machine, when viewed in a pulling direction starting at an entry end, is arranged in the following component sequence and comprises:

an umbilical/power umbilical comprising a plurality of elongated elements, wherein the plurality of elongated elements are different regarding at least one of a transversal cross section, material, function, and number;

a first die, wherein the first die is configured to receive and gather a first set of elongated elements of the plurality of elongated elements, the first die being substantially rectilinear from respective first supplies of the plurality of elongated elements;

a static second die, wherein the static second die is configured to receive and gather a second set of elongated elements of the plurality of elongated elements, the static second die being substantially rectilinear from respective second supplies of the plurality of elongated elements;

wherein the static second die is configured to close the first and second set of elongated elements into a gathered bundle;

at least one supporting means, wherein the at least one supporting means is configured to keep the gathered bundle radially in place;

a revolving device, wherein the revolving device is configured to revolve the gathered bundle torsional back and forth in an SZ oscillating way;

a tape or band wrapping apparatus which, immediately after the revolving device, applies band or tape circumferentially onto the gathered bundle of the plurality of elongated elements; and wherein the plurality of elongated elements comprise at least one of a power cable, a fluid pipe, an electric wire, an optical conductor, filler material, and at least one load carrying element.

2. The machine according to claim 1, comprising at least one set of caterpillar tracks for pulling the umbilical through the machine.

3. The machine according to claim 1, wherein the machine comprises turning mechanisms configured to alter a direction of the plurality of elongated elements.

4. The machine according to claim 1, wherein the revolving device performs a closing action and revolves one revolution per approximately 10 meters of umbilical length.

* * * * *